United States Patent [19]

Luke

[11] Patent Number: 4,675,723
[45] Date of Patent: Jun. 23, 1987

[54] SINGLE OSCILLATOR PAL GENERATOR LOCK SYSTEM

[75] Inventor: Rylan D. Luke, Mountain View, Calif.

[73] Assignee: Ampex Corporation, Redwood City, Calif.

[21] Appl. No.: 604,793

[22] Filed: Apr. 27, 1984

[51] Int. Cl.⁴ .............................................. H04N 9/44
[52] U.S. Cl. ...................................... 358/19; 358/17; 358/150
[58] Field of Search .................... 358/19, 17, 148, 150, 358/158

[56] References Cited

U.S. PATENT DOCUMENTS

| | | | |
|---|---|---|---|
| 4,278,994 | 7/1981 | Van der Valk | 358/148 |
| 4,328,513 | 5/1982 | Furihata | 358/19 |
| 4,450,474 | 5/1984 | Mizukami | 358/19 |
| 4,527,145 | 7/1985 | Haussmann | 358/19 |

OTHER PUBLICATIONS

Sims, "Principle of PAL Color Television"; pp. 70-73.

*Primary Examiner*—Michael A. Masinick
*Attorney, Agent, or Firm*—Harry G. Thibault; Joel D. Talcott

[57] ABSTRACT

A signal generator for generating a clocked PAL reference video signal from a single signal source wherein a counter-divider extracts subcarrier frequency component from the PAL reference video signal and modulator means in combination with a counter-divider extracts a horizontal frequency component from the PAL reference video signal, the single signal source permitting the signal components extracted therefrom to be fixed in a precise mathematical relationship.

13 Claims, 3 Drawing Figures

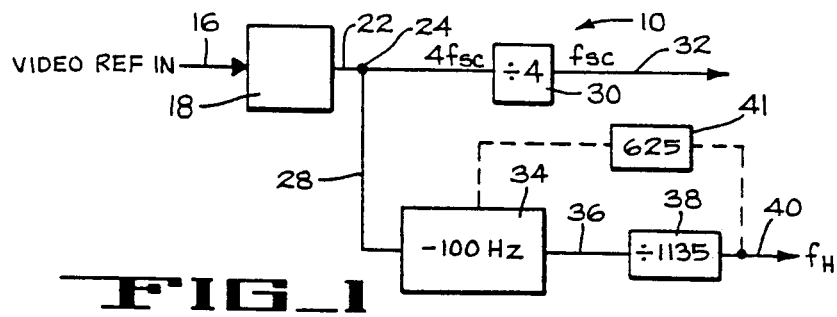
FIG_1
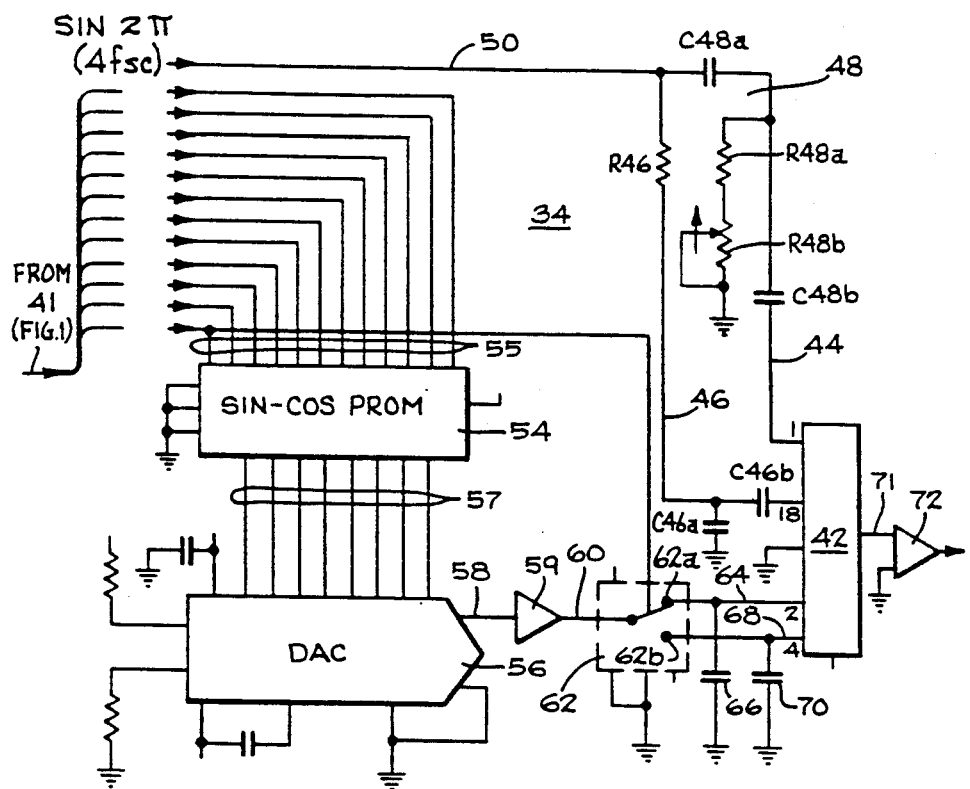
FIG_2
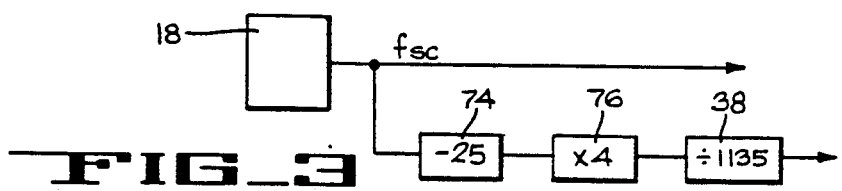
FIG_3

SINGLE OSCILLATOR PAL GENERATOR LOCK SYSTEM

This invention relates to signal generation and more particularly to a signal generator for producing PAL synchronizing signals having a fixed phase relationship to each other where the frequency of one signal is not an even multiple of the frequency of the other signal.

A television picture is created by scanning an electron gun across a screen of a cathode ray tube. The gun scans across the screen on one line and then resets and scans across the screen again on another line. The full video picture or frame is divided in two fields, each having half the number of scan lines of the whole picture. During each field, the gun scans alternate lines so that two consecutive fields are required to produce the complete picture. Part of the video information for each line is known as burst which is a portion of the subcarrier signal which is used to provide information for producing color. The phase of the subcarrier signal shifts each scanning line typically by 90 degrees in the NTSC system or by 45 degrees in the PAL system so that the phase of the subcarrier burst on every fourth line in NTSC or every eighth line in PAL is the same. If the relationship between the subcarrier phase and the horizontal line phase is lost, color sync will also be lost resulting in the video information being displayed in a color matrix having no relationship to an actual or desired color matrix.

In a television studio, a sync generator is used to produce pulses corresponding to video sync signals so that the proper relationship of all synchronizing information can be maintained. In the United States, where the NTSC system is used it is relatively simple to maintain phase relationship between color subcarrier and horizontal sync because $$2f_{sc} = 455 f_h$$

where $f_{sc}$ is the color subcarrier frequency and $f_h$ is the horizontal line or horizontal sync rate. Thus, it is only necessary to generate a signal at subcarrier frequency and then to multiply the signal $2f_{sc}$ by 2 and divide it by 910 to obtain the horizontal pulse, $f_h$. As one signal is generated from the other, the required fixed phase relationship between the signals will be reproduced.

In the PAL system, the relationship between horizontal frequency and subcarrier frequency is not as simple:

$$f_{sc} = 283\tfrac{3}{4} f_h + 25$$

This relationship results from the 25 Hz offset which is used in the PAL system. As a result, in order to generate both $f_{sc}$ and $f_h$ from the same oscillator so that the signals would have the required fixed phase relation, the oscillator would have to have a frequency equal to the lowest common multiple (LCM) of $f_{sc}$ and $f_h$. However, this number is greater than $1.1 \times 10^{10}$ Hz. Thus, a single oscillator scheme to generate both frequencies has not been available in the prior art.

To produce the synchronizing information, prior art systems required a pair of oscillators, each tied to a respective reference signal, to generate $f_{sc}$ and $f_h$ of the composite PAL signal and the respective oscillators had to be locked together in a phase locked loop in a manner known in the art. Because of the tendency of a phase locked loop to drift, it was extremely difficult to maintain the required fixed phase relationship between $f_{sc}$ and $f_h$ under the prior art schemes.

Accordingly, it would be desirable to provide a signal generator for generating the subcarrier and horizontal components of a composite PAL television broadcast signal which would eliminate the need for two independent oscillators to generate $f_{sc}$ and $f_h$. Further it would be desirable to provide a signal generator which would permit the signal output of a single oscillator to generate a modified PAL signal from which respective subcarrier and horizontal frequencies can be extracted in a fixed phase relationship.

In accordance with the present invention, a signal generator has a single oscillator which generates a PAL signal from which are extracted a color subcarrier component and a separate horizontal frequency component which have a fixed relationship of both phase and frequency.

The present invention relates to a PAL synchronizing signal generator for providing a color subcarrier-related signal and a horizontal sync-related signal in a fixed phase relationship wherein an oscillator generates a signal having a frequency related to the PAL color subcarrier frequency, secondary means offsets the frequency of the oscillator output signal by an amount sufficient to produce a second signal having a frequency related to the horizontal sync frequency, with means for providing a PAL color subcarrier signal from said first signal and means for providing a PAL horizontal sync signal from said second signal.

BRIEF DESCRIPTION OF THE DRAWINGS

FIG. 1 is a block diagram of a signal generator in accordance with the present invention;

FIG. 2 is a schematic diagram of a frequency modulator provided in FIG. 1; and

FIG. 3 is a block diagram of a second embodiment of the invention shown in FIG. 1.

DETAILED DESCRIPTION

Referring to FIG. 1 in accordance with the present invention a PAL synchronizing system generator 10 includes an oscillator 18 having an input connected to a signal input line 16 which delivers a PAL reference video signal to oscillator 18 which is clocked to an integer multiple ($4 \times f_{sc}$) of the PAL color subcarrier frequency. The oscillator 18 may take the form of a voltage controlled oscillator, for example. A signal line 22 is connected between an output of the oscillator 18 and a divider counter 30 to deliver the clocked input signal ($4 \times f_{sc}$) to the divider counter 30. The divider counter 30 divides the clocked input by 4 to generate the subcarrier frequency component, $f_{sc}$, of the clocked PAL reference video signal which was input to the oscillator 18.

The clocked PAL reference video signal from the oscillator 18 also passes through junction 24 to one input of a frequency modulator 34 to apply a 100 Hz offset to the clocked input. A signal output line 36 applies the output of frequency modulator 34 to one input of a second divider counter 38 which divides the $4f_{sc} - 100$ output of modulator 34 by 1135 to generate at its output on line 40 the horizontal frequency component, $f_h$ of the clocked PAL reference video signal output of the oscillator 18. The output $f_h$ of the divider-counter 38 is also directed to a counter 41 which inputs the frequency modulator 34.

In the PAL system, the relationship between the horizontal frequency component, $f_h$, and the frequency of the color subcarrier, $f_{sc}$ is a constant one. In particular $$f_{sc} = 283\tfrac{3}{4} f_h + 25 \qquad (1)$$

Multiplying each term in equation (1) by four, $$4f_{sc} = 4(283\tfrac{3}{4} f_h) + 4(25) \qquad (2)$$

or $$4f_{sc} = 1135 f_h + 100 \qquad (3)$$

Consequently, the frequency of the horizontal component, $f_h$, may be expressed as $$f_h = (4f_{sc} - 100)/1135 \qquad (4)$$

Referring to FIG. 1, as the output 22 of oscillator 18 is $4f_{sc}$, the required subcarrier frequency, $f_{sc}$, can be derived therefrom by dividing the output of oscillator 18 by 4. Divider counter 30 performs this function.

The required horizontal frequency, $f_h$, is derived in the following manner. The numerator of equation 4, i.e., $(4f_{sc} - 100)$, is derived by frequency modulator 34, as will be more fully discussed hereinafter. Thereafter, the division by the denominator of equation 4, i.e. 1135, is performed by divider counter 38.

Thus the single oscillator 18 clocks a PAL reference video signal from which the signal generator 10 respectively extracts the subcarrier frequency component, $f_{sc}$, of the PAL signal and the horizontal frequency component, $f_h$, of the PAL signal in frequency locked relation.

With regard to the function of frequency modulator 34, i.e. the production of a signal having a frequency of $(4f_{sc} - 100)$, it will be recalled that $$\cos 2\pi[u - v] = \cos 2\pi[u]\cos 2\pi[v] + \sin 2\pi[u] \sin 2\pi[v] \qquad (5)$$

By letting $$u = 4f_{sc} \qquad (6)$$

and $$v = 100 \text{ Hz} \qquad (7)$$

then $$\cos 2\pi[4f_{sc} - 100] = \cos 2\pi[4f_{sc}] \cos 2\pi(100) + \sin 2\pi[4f_{sc}] \sin 2\pi[4f_{sc}] \sin 2\pi[100] \qquad (8)$$

Consequently, according to equation (8), the required frequency of $4f_{sc} - 100$ may be derived from the sum of the product of two cosine and sine functions of the appropriate frequencies. The required mathematical operation of equation 8, i.e., the product of two cosine terms, the product of two sine term, and the addition thereof is performed by an analog device, as more fully described hereinafter. The required terms of $\cos 2\pi[4f_{sc}]$ and $\sin 2\pi[4f_{sc}]$ are derived by using the output signal of oscillator 18 and an analog lead and lag network, as more fully described hereinafter. The required terms of $\cos 2\pi[100]$ and $\sin 2\pi[100]$ are derived through the use of a PROM, having corresponding values of the sine and cosine functions stored therein, a digital-to-analog converter, and a sample and hold circuit, as more fully described hereinafter.

Referring to FIG. 2, modulator 42 performs the required mathematical operation of equation 8. In the preferred embodiment, a model LM 1889 T.V. Video Modulator device manufactured by National Semiconductor Corporation of Santa Clara, Calif. was used to implement modulator 42. Modulator 42 has a pair of signal input lines 44 and 46 connected respectively to pins 1 and 18 of the modulator 42 from an R-C network 48. The term $\cos 2\pi[4f_{sc}]$ is supplied to pin 1, the term $\sin 2\pi[4f_{sc}]$ is supplied to pin 18, the term $\sin 100$ is supplied to pin 2, and the term $\cos 100$ is supplied to pin 4, as more fully discussed hereinafter.

The terms $\sin 2\pi(4f_{sc})$ and $\cos 2\pi(4f_{sc})$ and $\cos (4f_{sc})$ are derived in the following manner. The R-C network 48 includes a fixed resistor R46 and capacitors C46a and C46b provided on line 46 and capacitors C48a and C48b, fixed resistor R48a and variable resistor R48b provided in line 48. The R-C network 48 receives a signal input sine $4f_{sc}$ along signal input line 50. The R-C network 48 causes the inputs on lines 44 and 46 to either lead or lag the $\sin(2\pi(4f_{sc}))$ input on line 50 by 45 degrees. Thus there is a phase shift of 90 degrees between pins 1 and 18 of the modulator 42. A phase shift of 90 degrees means an input of $\cos 2\pi(4f_{sc})$ going into one input (pin 1) of the modulator 42, and an input of $\sin 2\pi(4_{sc})$ going into the other input (pin 18) of the modulator 42.

The term $\sin 2\pi(100)$ is supplied to modulator 42 on pin 2, and the term $\cos 2\pi(100)$ supplied to modulator 42 on pin 4. The required sine and cosine function of 100 Hz are generated through the use of SIN-COS PROM 54, digital-to-analog converter 56, amplifier 59, switch 62, and capacitor 66 and 70.

Broadly speaking, SIN-COS PROM 54 has stored therein the corresponding values for the sine and cosine functions. Consequently, by sequentially addressing the appropriate location within SIN-COS PROM 54, the corresponding digital value of the sine and cosine functions will be produced therefrom. Digital-to-analog converter 56 thereafter operates to convert the digital values to analog values which are thereafter supplied to modulator 42. In particular, sequential values of the sine function of 100 Hz are placed on capacitor 66, and sequential values of the cosine function of 100 Hz are placed on capacitor 70 by the operation of switch 62. The addressing of SIN-COS PROM 54 is derived from a binary counter 41 operation, from the horizontal frequency, $f_h$.

In particular, referring to FIGS. 1 and 2, the horizontal frequency $f_h$ is used to provide the addresses to SIN-COS PROM 54 through counter divider 41.

A line count generated by the line counter 41 is input to a sine-cosine PROM 54 by data input lines 55. PROM 54 generates a sine-cosine output which is transferred to a digital to analog converter 56 (DAC) by signal input lines 57.

The least significant bit of the PROM 54 determines whether the PROM samples the value $\sin 2\pi(100 \text{ Hz})$ or $\cos 2\pi(100 \text{ Hz})$. The sampled digital value is sent to the digital-to-analog converter 56, converted to an analog signal and then sent through the operational amplifier 59 and into the switch 62 that is actually two sample and hold switches. On line 64 and capacitor 66 the value $\sin 2\pi(100 \text{ Hz})$ is sampled and on line 68 and capacitor 70 the value $\cos(100 \text{ Hz})$ is sampled. Thus $\sin 2\pi(100 \text{ Hz})$ is input to the modulator 42 on pin 2 and $\cos 2\pi(100 \text{ Hz})$ to the modulator 42 on pin 4.

In particular, the analog output of DAC 56 is transferred to an operational amplifier 59 on signal output line 58. A signal output line 60 connects operational amplifier 59 to a switch 62. Contact point 62a of the switch 62 is connected to pin 2 of the modulator 42 by signal input line 64 which also includes a capacitor 66. Contact point 62b of the switch 62 is connected to pin 4 of the modulator 42 by signal input line 68 which also includes a capacitor 70. The switch 62 samples the output of operational amplifier 59 and transfers it to the modulator 42 on either line 64 or 68. The signal output $4f_{sc}-100$ of the modulator 42 is applied on signal output line 71 to a comparator 72.

The output of the modulator 42 is ($4f_{sc}-100$) or ($1135 \times f_h$) as described above. The analog output signal, $4f_{sc}-100$ Hz is input to the comparator 72 on line 71 from the modulator 42 to generate the TTL signal 1135 $f_h$ which may be used by the counter 38 to produce the horizontal frequency, $f_h$.

It should be noted that the signal generator 10 could be clocked at a rate of $1 \times f_{sc}$ wherein modulator 34 and divider counter 38 would be modified to respectively extract an offset 25 Hz from $f_{sc}$ and divide $f_{sc}-25$ by $283\frac{3}{4}$ to obtain $f_h$ in the manner discussed in connection with FIG. 3.

FIG. 3 teaches a second embodiment of the present invention which the frequency modulator 34 may be replaced by a modulator element 74 which would operate on the standard PAL reference video signal input, $(283\frac{3}{4} \times f_h)+25$ Hz from an oscillator 18 to extract the 25 Hz offset. Thereafter oscillator 76 dependent on the phase-locked output of the oscillator 18, clocks the output of element 74 by four to generate 1135 $f_h$. The remainder of the circuit operates as previously described.

Thus the present invention provides a signal generator which receives a reference PAL video synchronizing signal, uses a single subcarrier frequency related signal generator which is associated with further means to drive a subcarrier frequency signal and horizontal frequency signal that are fixed in phase relative to each other, the signal generator further providing respective means to extract the subcarrier frequency, $f_{sc}$ and the horizontal frequency, $f_h$, from the PAL reference signal using the known mathematical relationship for such signal components to produce a pair of output signals that are frequency locked to each other in a known mathematically precise relationship.

Although the present invention has been set forth in a manner to describe a particular embodiment of the present invention, it will be appreciated that various changes and modifications can be made in the elements described without effecting the definition of the invention as set forth in the appended claims.

What is claimed is:

1. A PAL synchronizing signal generator for providing a color subcarrier-related signal and a horizontal sync-related signal in a fixed relationship, comprising:
    means for generating a first signal having a frequency related to PAL color subcarrier frequency;
    means for offsetting the frequency of said signal generated means signal by an amount sufficient to produce a second signal having a frequency related to horizontal sync frequency;
    means for providing a PAL color subcarrier signal from said first signal; and
    means for providing a PAL horizontal sync signal from said second signal.

2. A PAL synchronizing signal generator as claimed in claim 1 wherein the first signal generating means further comprising means for producing the first signal so that the frequency thereof is an integer multiple of a PAL color subcarrier signal.

3. A PAL synchronizing signal generator as recited in claim 1 wherein said first signal generating means is a voltage controlled oscillator.

4. A PAL synchronizing signal generator as claimed in claim 1 wherein the frequency offsetting means comprises a frequency modulator which modifies the first signal to generate the second signal which is a multiple of the horizontal sync frequency.

5. A PAL synchronizing signal generator as claimed in claim 4 wherein the frequency modulator comprises a modulator receiving the first signal related to the PAL color subcarrier frequency, a frequency offset signal, the modulator combining said first signal and said frequency offset signal to generate said second signal.

6. A PAL synchronizing signal generator as claimed in claim 5 wherein the first signal has a frequency corresponding to a value $nf_{sc}$ where $nf_{sc}$ is an multiple of a subcarrier frequency $f_{sc}$, and the frequency offset input signal has a frequency corresponding to an integer amount $v$ and the modulator combines the first signal and the frequency offset input signal in the formula:

$$\cos(nf_{sc}-v) = \cos(nf_{sc})(v) + \sin(nf_{sc}\sin(v)) \text{ and}$$
generates an output that is a function of $nf_{sc}-v$.

7. A PAL synchronizing signal generator as claimed in claim 6 wherein an R-C network is provided between the first signal and the modulator, so that two signals differing in phase by 90 degrees are supplied to the modulator.

8. A PAL synchronizing signal generator as claimed in claim 6 wherein the frequency offset input is generated from the horizontal sync-related signal and modified by signal processing means to generate respective sin $v$ and cos $v$ signal inputs that are applied to the modulator.

9. A PAL synchronizing signal generator as claimed in claim 1 wherein the means for providing a PAL color subcarrier signal from said first signal comprises a counter-divider.

10. A PAL synchronizing signal generator as claimed in claim 1 wherein the means for providing a PAL horizontal sync signal from said second signal comprises a signal modulator and a counter divider.

11. A PAL synchronizing signal generator for providing a color subcarrier-related signal and a horizontal sync-related signal in a fixed relationship, comprising:
    oscillator means for clocking a first signal input to the oscillator to a signal output having a frequency corresponding to four times the PAL color subcarrier related frequency;
    means for subtracting 100 Hz from the frequency of said oscillator means generated signal to produce a second signal having a frequency related to horizontal sync frequency;
    a frequency divider for dividing the four times PAL color subcarrier signal by four to generate a PAL reference color subcarrier signal from said first signal; and
    a frequency divider for dividing said second signal by 1135 to generate a PAL reference horizontal sync signal.

12. A PAL synchronizing signal generator for providing a color subcarrier-related signal and a horizontal sync-related signal in a fixed relationship, comprising:

oscillator means for clocking a signal input to the oscillator to a signal output having a frequency related to the PAL color subcarrier frequency;

means for subtracting 25 Hz from the frequency of said oscillator means generated signal to produce a second signal having a frequency related to the horizontal sync frequency $f_h$;

means for generating a PAL reference color subcarrier signal from said first signal; and means for multiplying the second signal by 4 to generate a signal output of $1135 \times f_h$ and a frequency divider for dividing said signal output by 1135 to generate a PAL reference horizontal sync signal from said output signal.

13. A synchronizing signal generator for providing a color subcarrier-related signal and a horizontal sync-related signal in a fixed relationship from a single reference video signal, comprising:

means for generating a first signal having a frequency related to the color subcarrier frequency;

means for offsetting the frequency of said signal generated means signal by an amount sufficient to produce a second signal having a frequency related to horizontal sync frequency;

means for providing a color subcarrier signal from said first signal; and means for providing a horizontal sync signal from said second signal.

* * * * *